United States Patent [19]
Grosspietsch et al.

[11] Patent Number: 5,979,632
[45] Date of Patent: Nov. 9, 1999

[54] DISENGAGEMENT MECHANISM FOR CLUTCH ACTUATION IN MOTOR VEHICLES

[75] Inventors: Wolfgang Grosspietsch; Ulrich Husse, both of Schweinfurt; Bernd Stockmann, Röthlein, all of Germany

[73] Assignee: Mannesmann Sachs AG, Schweinfurt, Germany

[21] Appl. No.: 09/169,176

[22] Filed: Oct. 8, 1998

[30] Foreign Application Priority Data

Oct. 10, 1997 [DE] Germany ............................ 197 44 821

[51] Int. Cl.⁶ ...................................................... F16D 23/14
[52] U.S. Cl. ......................... 192/98; 192/99 S; 192/110 B
[58] Field of Search .................................. 192/98, 99 S, 192/110 R, 110 B

[56] References Cited

U.S. PATENT DOCUMENTS

| | | | |
|---|---|---|---|
| 3,277,988 | 10/1966 | Pitner | 192/98 |
| 4,498,566 | 2/1985 | Renaud | 192/98 |
| 4,629,049 | 12/1986 | Lassiaz | 192/98 |
| 5,273,146 | 12/1993 | Nakamura et al. | 192/98 |

FOREIGN PATENT DOCUMENTS 38 10 369A1  10/1989  Germany .
09014291    1/1997   Japan .

*Primary Examiner*—Richard M. Lorence
*Attorney, Agent, or Firm*—Cohen, Pontani, Lieberman & Pavane

[57] ABSTRACT

A sliding sleeve for a disengagement mechanism for clutch actuation in motor vehicles has at least two pairs of cams with convexities of different heights from an actuation level on the sliding sleeve that is connectable to the clutch. Each of the pairs of cams selectively fits into a window of an oscillating link or clutch release fork, whereby the oscillating window and sliding sleeve have contours that fix the sliding sleeve at one position. By selecting which of the pair of cams engages the oscillating link or clutch release lever, different mounting heights of the actuation level on the sliding sleeve from the oscillating link or the clutch release fork may be realized.

10 Claims, 3 Drawing Sheets

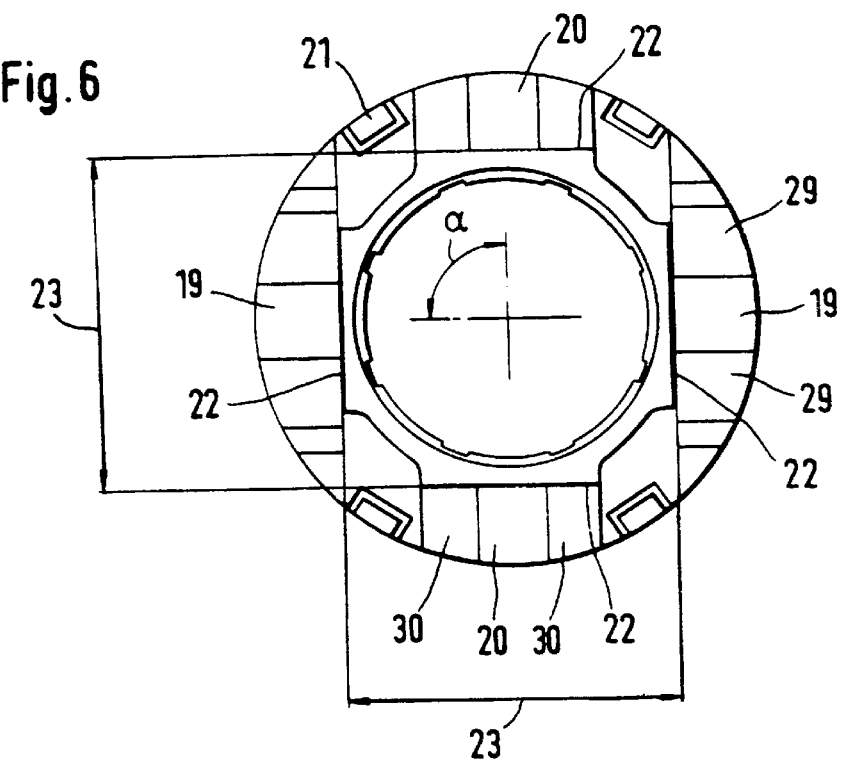
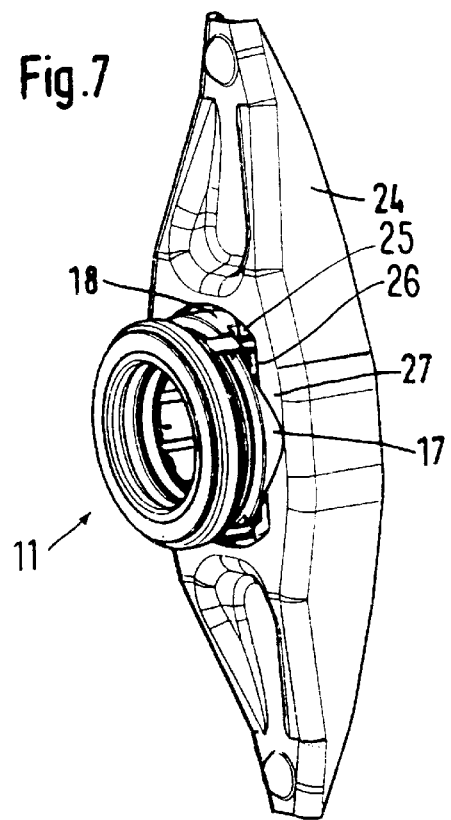
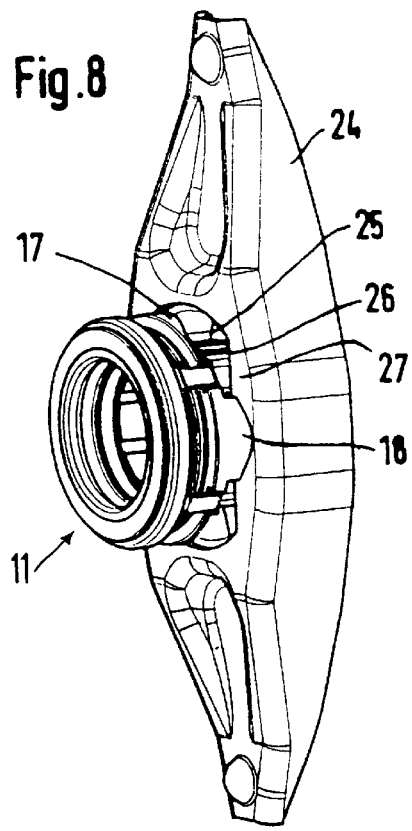

DISENGAGEMENT MECHANISM FOR CLUTCH ACTUATION IN MOTOR VEHICLES

BACKGROUND OF THE INVENTION

1. Field of the Invention

The invention relates to a disengagement mechanism for clutch actuation in motor vehicles.

2. Description of the Related Art

A prior art disengagement system known from reference DE 38 10 369 A1 includes a clutch release fork having one end that is pivotally supported on a casing part and another end that is connected to an operating mechanism. An area lying between these two ends has an opening that is penetrated by a gear shaft and partially penetrated by a release bearing, whereby two brackets located opposite each other on a sliding sleeve 8 of the clutch release bearing are provided for fastening the clutch bearing to the clutch release fork. A radial flange located on the sliding sleeve has two convexities whose crown line interacts with a surface of the clutch release fork. The convexities on the radial flange are limited toward the middle of the sliding sleeve by a boundary edge that interacts with a guide edge in the clutch release fork to assume a position relative to the clutch release fork that is secured against torsion.

SUMMARY OF THE INVENTION

In contrast to the aforementioned prior art, a sliding sleeve of a disengagement mechanism according to the present invention has cams that correspond to the aforementioned convexities. But unlike the prior art, the cams of the present invention exhibit different paired heights by means of which at a given actuation level, different mounting heights may be realized. There are pairs of cams rotated by, for example, 90° relative to each other such that one of the pairs can be fitted into a window of an oscillating link or clutch release fork, whereby the sliding sleeve as well as the window of the oscillating link has contours that fix the sliding sleeve in either one or the other position. The purpose of the invention lies in the use of one and the same installed disengagement mechanism to attain different mounting heights while using different combinations of motors and gears.

It is an object of the invention to create a disengagement mechanism for clutch actuation in motor vehicles that allows selecting one of at least two different mounting heights from an actuation level of the clutch and the disengagement mechanism without using additional parts, whereby the difference in mounting heights goes beyond the possible adjustment range of the disengagement mechanism and/or helps to avoid an excessive slanted position of the disengagement oscillating link or clutch release fork.

The attainment of this object is achieved by a disengagement mechanism for actuating a clutch in a motor vehicle including a sliding sleeve axially movably mountable on a guide sleeve. The sliding sleeve has at least two diametrically opposed pairs of cams with each of the cams having contact surfaces operatively disposed for selective interaction with one of a clutch release fork or an oscillating link of the clutch. The contact surfaces of the first of the two diametrically opposed pairs of cams has a first mounting height and the contact surfaces of the second of the two diametrically opposed pairs of cams has a second mounting height.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 6 is a view of the clutch disengagement mechanism in the axial direction showing a guide contour that runs quadratically on the sliding sleeve;

FIG. 7 is a perspective view of the combination of the clutch disengagement mechanism with an oscillating link upon contact of the first cam on an actuation surface to create the low mounting height; and FIG. 8 is a perspective view of the combination as in FIG. 7 upon contact of the second cam to produce the greater mounting height.

DETAILED DESCRIPTION OF THE PRESENTLY PREFERRED EMBODIMENTS

Figure 1:
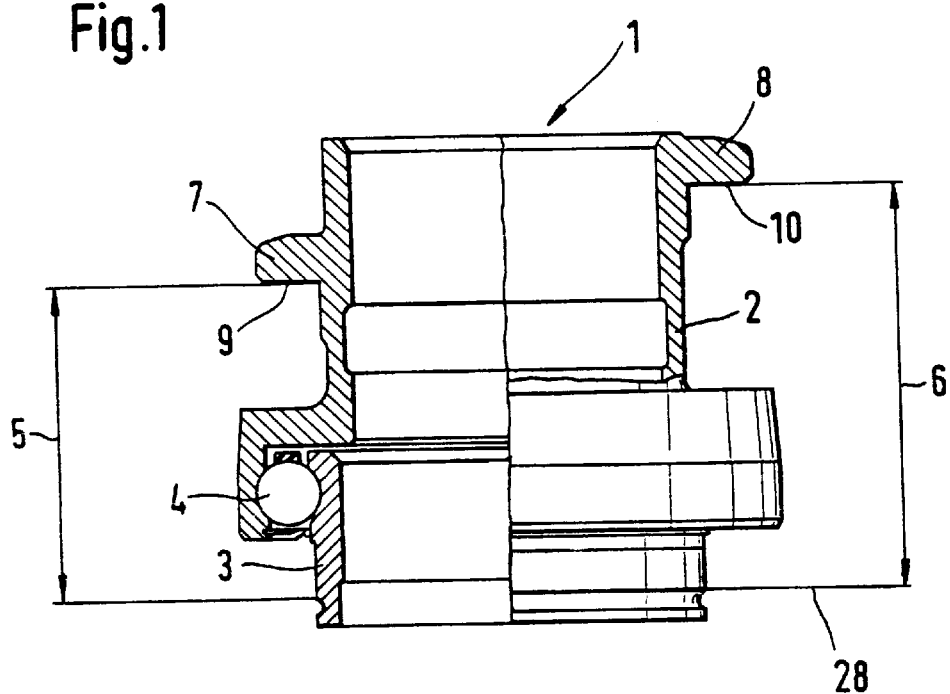
FIG. 1 is a partial sectional view of a clutch disengagement mechanism for tension actuation according to an embodiment of the present invention with cams of different mounting heights on a sliding sleeve along line I—I of FIG. 2.

Referring to FIG. 1, a disengagement mechanism according to an embodiment of the present invention includes a clutch release lever 1 for tension actuation of the clutch comprises a sliding sleeve 2 and an inner ring 3 as part of a clutch bearing 4. The sliding sleeve 2 has on its cylindrical exterior surface a first pair of cams 7 and a second pair of cams 8. The first pair of cams 7 has contact surfaces 9 and the second pair of cams 8 has contact surfaces 10 that interact with an externally controllable operating mechanism. The inner ring 3 contacts the springs of the clutch (not shown), whereby an actuation level 28 may be defined that results from the form of the inner ring 3. The first contact surface 9 is separated by a first mounting height 5 from this actuation level 28, and the second contact surface 10 has a mounting height 6 from the actuation level 28 that is greater than the first mounting height 5. The clutch release lever 1 is axially movably mountable on a guide sleeve (not shown) for releasing the clutch.

Figure 2:
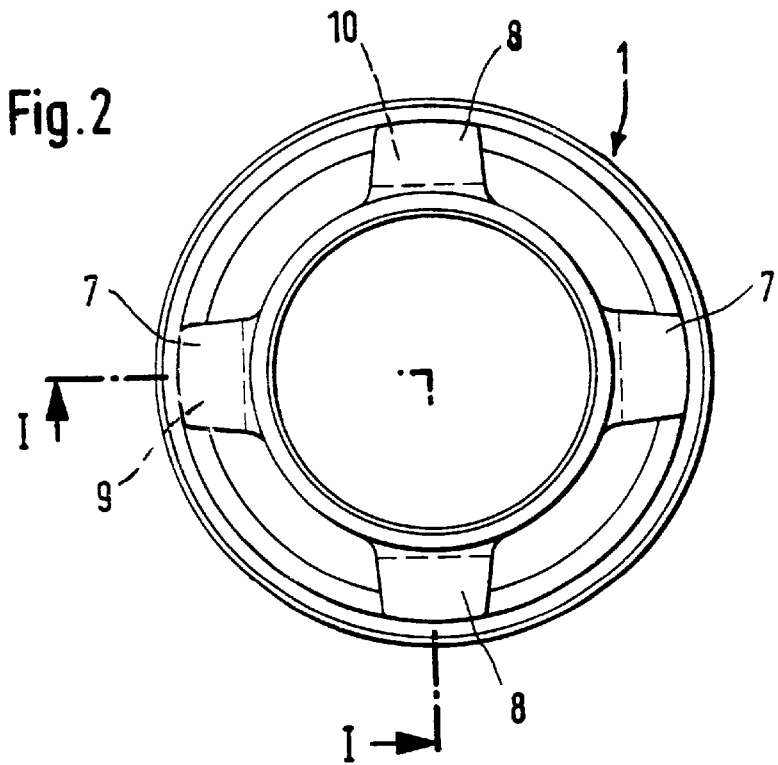
FIG. 2 is an end view showing the clutch disengagement mechanism of FIG. 1 with the arrangement of the cams around the circumference of the sliding sleeve.

From FIG. 2 it is clear that the first pair of cams 7 lie opposite each other on the sliding sleeve 2 and create a pair of cams 7 that has the mounting height 5, while the second pair of cams 8 lie opposite each other, located offset by 90° from the first pair of cams 7 on the sliding sleeve 2. This arrangement of the first and second pairs of cams enables the operation of the clutch release lever 1 either via the contact surfaces 9 of the first pair of cams 7 or via the contact surfaces 10 of the second pair of cams 8. The contact between an actuation element and the respective one of the first and second pairs of cams 7 or 8 is achieved by turning the mounting position of the clutch release lever 1 by 90°. Because the mounting position of the clutch release lever 1 always depends upon which of the first and second pairs of cams 7 and 8 is connected to the actuation element, an actuation level 28 results that is either nearer to or farther from the actuation element. In the preferred embodiment, the difference in the two mounting heights 5 and 6 is greater than the adjustment distance path of the clutch release lever 1 on the guide sleeve.

Figure 3:
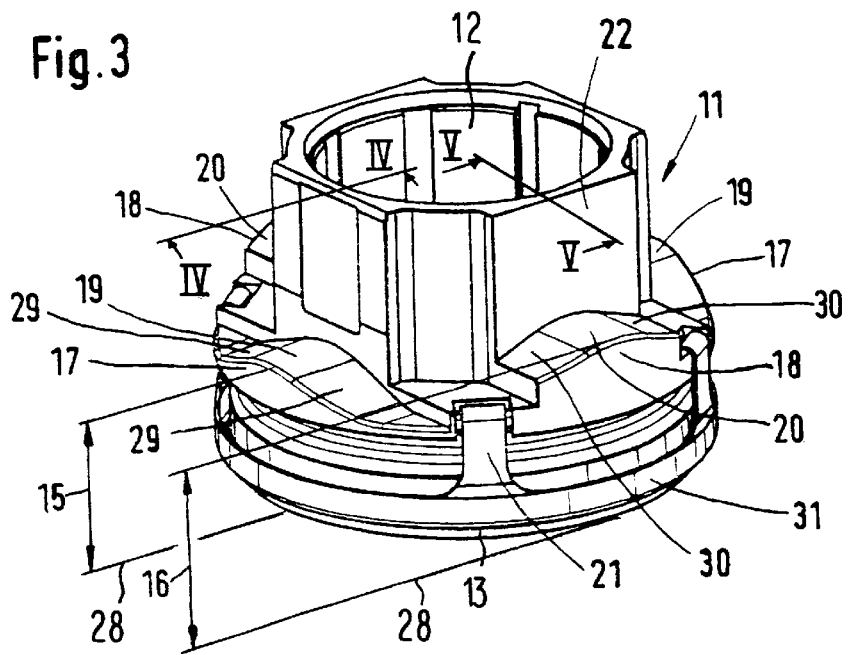
FIG. 3 is a perspective view of a clutch disengagement mechanism for pressure actuation according to an embodiment of the present invention with cams of different mounting heights shown in perspective.
Figure 4:
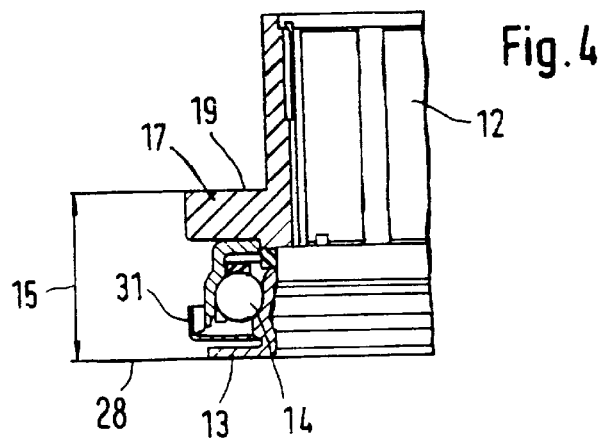
FIG. 4 is a partial sectional view of the clutch disengagement mechanism along line IV—IV of FIG. 3 with the first cam and a low mounting height.
Figure 5:
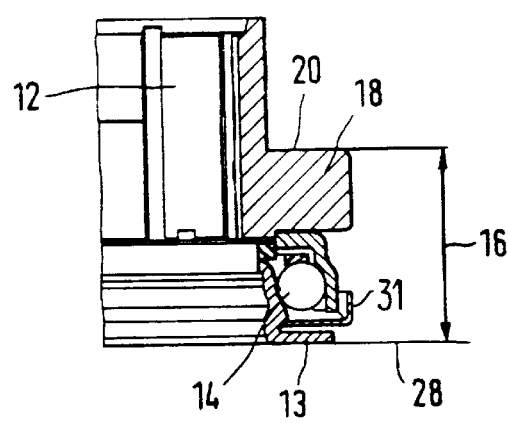
FIG. 5 is a partial sectional view of the clutch disengagement mechanism along line V—V of FIG. 3 with the second cam and a greater mounting height.

Referring now to FIGS. 3, 4, and 5, a clutch release lever 11 is illustrated that is suitable for motor vehicles with pressure-activated clutches. This clutch release lever 11 has a sliding sleeve 12 with which, via a clutch bearing 14, an inner ring 13 is connected, at the end of which an actuation level 28 is achieved in relation to a motor vehicle clutch. The sliding sleeve 12 has, as best seen in the projection along the central axis shown in FIG. 6, a guide contour 22 corresponding to a square and serves as limiting lines for the cams 17 and 18, which are connected radially on the outside. The cams 17 and 18 are connected on a flange-like enlargement region of the sliding sleeve 2 which corresponds to the diameter of the clutch release lever 11, whereby the cams 17 and 18 are axially oriented. The first cam 17 has a first contact surface 19 and the second cam 18 has a second contact surface 20. The contact surfaces 19 and 20 each form a cam-like bulge with the object of producing contact between an actuating element and their crown lines.

The crown lines on the contact surfaces 19 of the cams 17, seen from the actuation level 28 in the axial direction of the clutch release lever 11, are separated by a first mounting height 15, while the crown lines of the contact surfaces 20 of the cams 18 lie at a distance of a second mounting height 16 from the actuation level 28.

The clutch bearing 14 is connected in the axial direction to the sliding sleeve 2 by a holder 31 with clips 21 that snap into pockets located in the sliding sleeve 2. By virtue of the special shape of the clips 21 the clutch bearing 14 lies constantly under tension axially on the sliding sleeve 2.

In FIG. 6 the guide contour 22 can be seen in its quadratic dimension, whereby each lateral length of the square corresponds to an external dimension 23. Outside the contour 22 the contact surfaces 19 and 20 of cams 17 and 18 are arranged such that the contact surfaces 19 extend over the external dimension 23 of the guide contour 22 so that there is sufficient lateral room in the pivoting space of the contact surface 20 to accommodate the clips 21, whereas the contact surfaces 20 belonging to the second cams 18 have a greater height than the contact surfaces 19 of the first cams 17.

FIG. 7 shows the connection of an oscillating link 24 to the clutch release lever 11. The clutch release lever 11 is received in a contour 26 of the oscillating link, whereby the contact surface 19 of the cam 17 interacts with an actuation surface 27 of the oscillating link 24, while the higher cam 18 move freely through the oscillating window 25. In this way it is guaranteed that the oscillating link 24 has sufficient free space for a swinging motion when the lever is operated.

Referring now to FIG. 8, by turning the clutch release lever 11 by 90° the higher cam 18 with its contact surface 20 is brought into connection with the actuation surface 27 of the oscillating link 24. In this position the second mounting height 16 results between the actuation surface 27 on the oscillating link 24 and the actuation level 28 on the clutch release lever 11. The contour 26 in the oscillation window 25 selectively receives two opposing sides of the guide contour 22 of sliding sleeve 12.

The description of the connection of the clutch release lever 11 to the oscillating link 24 is focussed on a design with two mounting heights 15 and 16. If properly constructed, however, combinations of clutch release levers 1, 11 with oscillating links 24 are conceivable that can be installed with three pairs of cams offset by 60° around the circumference of the sliding sleeve 2 to produce three different mounting heights. To avoid installation errors, the combination of the clutch release lever 11 with the oscillating link 24 may be identified by a mark on the flanks or sides 29 or 30 of the cams 17 or 18 of the clutch release lever 11 in such a way that, depending upon the installation specifications, the appropriate mark is always visible in the oscillation window 25, while the mark assigned to another mounting situation is concealed.

In this way, in pull-operated clutches it is even conceivable in the extreme case to have a clutch release lever for single-plate and double-plate clutches if the axial structural space behind the clutch release lever is sufficient.

The invention is not limited by the embodiments described above which are presented as examples only but can be modified in various ways within the scope of protection defined by the appended patent claims.

We claim:

1. A disengagement mechanism for actuating a clutch of a motor vehicle, comprising:
    a sliding sleeve having a longitudinal axis axially movably mountable on a guide sleeve and having a first axial end and a second axial end, said sliding sleeve being connectable to the clutch at an actuation level position on said sliding sleeve proximate said second axial end;
    a first pair of cams disposed on diametrically opposed sides of said sliding sleeve;
    a second pair of cams disposed on diametrically opposed sides of said sliding sleeve at an angular distance ($\alpha$) from said first pair of cams with respect to said longitudinal axis;
    each said first pair of cams and said second pair of cams having contact surfaces, wherein said contact surfaces on said first pair of cams are a first axial distance from said actuation level position and said contact surfaces on said second pair of cams are a second axial distance from said actuation level position; and
    one of a clutch release fork and an oscillating link selectively interactable with one of said first pair of cams and said second pair of cams for moving said sliding sleeve between a first position and a second position for actuating the clutch.

2. The disengagement mechanism of claim 1, wherein said first and second pairs of cams selectively interact with said one of said clutch release fork and said oscillating link such that said contact surfaces of said first pair of cams interact with said one of said clutch release fork and said oscillating link when said sliding sleeve is in a first angular position and said contact surfaces of said second pair of cams interact with said one of said clutch release fork and said oscillating link when said sliding sleeve is turned by said angular distance ($\alpha$) to a second angular position.

3. The disengagement mechanism of claim 1, wherein said angular distance ($\alpha$) equal approximately 90°.

4. The disengagement mechanism of claim 1, further comprising a third pair of cams disposed on diametrically opposed sides of said sliding sleeve at said angular distance (α) from said second pair of cams, wherein said angular distance (α) equals approximately 60°.

5. The disengagement mechanism of claim 1, wherein said sliding sleeve comprises a guide contour that is insertable in a receiving contour of said one of said clutch release fork and said oscillating link.

6. The disengagement mechanism of claim 5, wherein said receiving contour of said one of said clutch release fork and said oscillating link is part of an oscillating window.

7. The disengagement mechanism of claim 6, wherein said receiving contour of said one of said fork and said oscillating link is operatively shaped in a dihedral form for permitting said sliding sleeve to be selectively mounted in said receiving contour in one of said first angular position and said second angular position.

8. The disengagement mechanism of claim 1, wherein said sliding sleeve of further comprising a disengagement bearing and clips operatively mounted on said sliding sleeve for connecting said disengagement bearing and said sliding sleeve.

9. The disengagement mechanism of claim 8, wherein said clips are disposed circumferentially between said first and second pairs of cams on said sliding sleeve.

10. The disengagement mechanism of claim 1, further comprising flanks disposed on said first and second pairs of cams on which markings have been made corresponding to a mounting height associated with one of the first and second pairs on which the marking is located, said marking being disposed such that only one marking at a time is legible through said oscillating window corresponding to said one of the first and second pairs of cams interacting with said one of said clutch release fork and said oscillating link.

* * * * *